July 7, 1931.    J. H. DEPPELER    1,813,032

MOLD FOR ALUMINO THERMIC WELDING OF RAILS

Filed Aug. 23, 1929

INVENTOR
John H. Deppeler
BY
HIS ATTORNEY

Patented July 7, 1931

1,813,032

UNITED STATES PATENT OFFICE

JOHN H. DEPPELER, OF WEEHAWKEN, NEW JERSEY

MOLD FOR ALUMINO-THERMIC WELDING OF RAILS

Application filed August 23, 1929. Serial No. 387,833.

In the welding of railway rails end to end by the alumino-thermic process, or more generally by means of superheated molten steel, it has been customary to provide the space around the ends of the rails for the reception of the superheated metal which forms the welded joint, by applying a two part mold to the ends of the rails, which mold extends well above the tread surfaces of the rails to accommodate the pouring gate and the vent, and also to constitute a temporary reservoir for the slag. Such a mold was usually made in two parts, of refractory material, shaped by ramming said material into a suitable flask or mold box and around a wooden pattern having a collar which forms the mold cavity or space into which the molten metal is teemed after the mold has been clamped in position to enclose the rail ends.

In recent years certain improvements have been made in the means for effecting welds of this character to permit the welding operations to be carried out without interrupting traffic over the rails, but these improvements, usually involving bridging elements or special forms of clamps to hold the rail ends rigidly in alignment during the passing of wheel loads, have proved to be complicated and expensive, and in some cases not altogether satisfactory.

Figure 1:
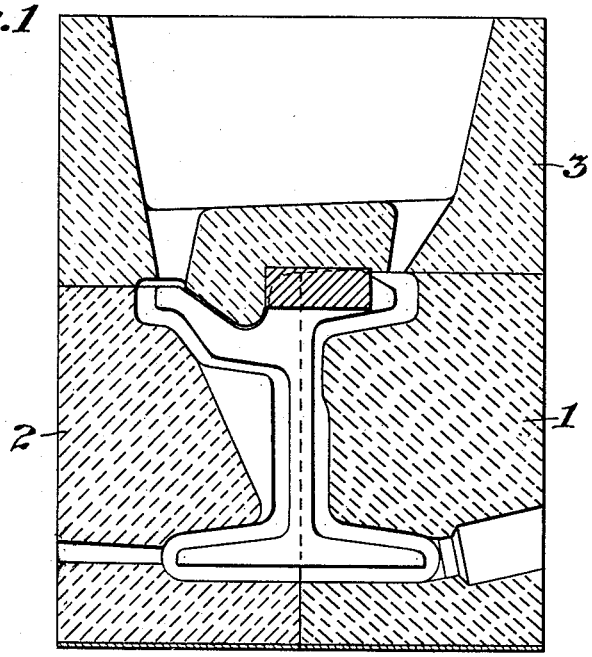
Figure 2:
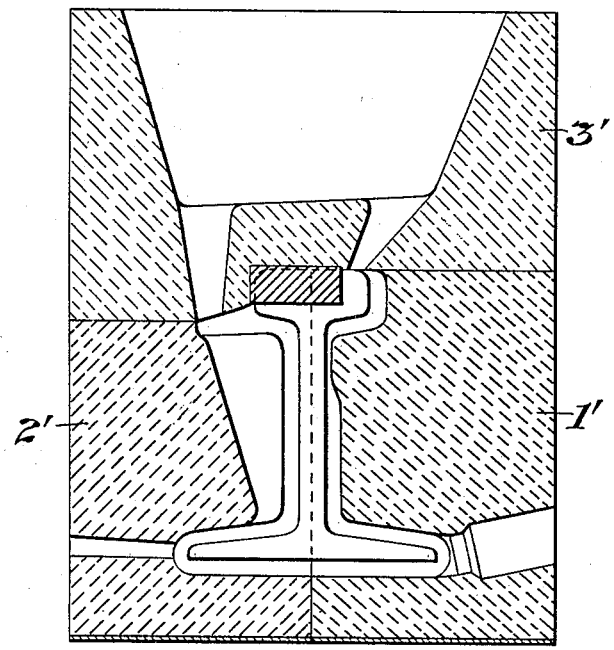

The present invention contemplates a mold possessing all of the advantages of the former types of molds which completely enclose the rail ends and extends above the tread surface thereof, but which will nevertheless permit the traffic to proceed uninterruptedly during the welding operations. To this end the invention comprises a refractory mold formed of two lower sections which are divided longitudinally, as under the old practice, but which extend only up to or about the level of the tread surface of the rails, and an upper mold section removably fitted to and constituting a completing supplement to the lower sections, and which may be quickly removed from its position to permit the passing of traffic and which will not interfere with the applied lower mold sections, as all parts of the latter occupy positions in which they cannot be engaged by either the treads or flanges of the traffic wheels. The invention is illustrated in the accompanying drawings, in which:

Fig. 1 is a sectional elevation of a mold as applied to the ends of standard grooved or girder rails, and Fig. 2 is a similar view showing a mold applied to the ends of standard T-rails.

Referring to Fig. 1, 1 and 2 indicate the lower sections of a refractory mold adapted to be secured to the opposite sides of the rail ends at the point where the welded joint is to be made, the mold sections having the general characteristics of the refractory molds of this character as heretofore employed, except that each mold section terminates at or about the level of the tread surfaces of the rail. In this particular type of mold, which is adapted to effect the welding of girder rails, the upper portions of the refractory mold sections 1 and 2 terminate at the level of the tread face of the rail on the one end and the level of the grooved flange on the other, so that no portions of either mold section will be engaged by the wheels of traffic passing over the site of the welded joint.

In order to complete the mold, there is formed a separate top section 3 which constitutes a completing supplement to the two lower sections 1 and 2, the bottom surface of the top section forming a tight joint with the top surfaces of the two lower sections and, as shown, the top section being provided with a bottom conforming to the tread and grooved surfaces of the rails and having therein the usual pouring gate and vent opening, the hollow central portion of the upper section constituting a reservoir for the slag resulting from the alumino-thermic reaction, in case the latter is employed in producing the superheated molten steel to effect the welded joint.

With this particular construction of three part mold, it will be apparent that the two lower mold sections 1 and 2 may be clamped to the rail ends by means usually provided for this purpose, and the upper section 3 may be positioned on the lower mold sections during the preheating operations and also during the pouring of the molten metal to effect the weld, but may be quickly displaced and removed to permit traffic to proceed over the site of the joint without interruption. If traffic is frequent the upper mold section may be prepared and preheated or dried at a place entirely independent of the site of the welded joint, in which case a temporary top section or cope may be substituted to enable the preheating of the rail ends and the lower mold sections, without undue loss of heat. After the preheating has been accomplished, the temporary cope may be removed and the upper mold section applied for the short interval necessary to effect the teeming of the molten metal into the mold. As this casting operation requires a very short time it will be apparent that the interruption to traffic will be nil or negligible, as the upper mold section may be removed very shortly after the molten metal has been teemed into the mold. In case the time intervals between traffic is sufficiently long, the three mold sections may be properly assembled in clamped relation and the preheating and casting operations carried out without interrupting traffic.

The mold shown in Fig. 2 is in all respects equivalent to that shown in Fig. 1, except that it is adapted to the welding together of the ends of standard T-rails. The mold includes two lower sections 1' and 2' which are divided longitudinally and are adapted to enclose the ends of the rails up to the level of the tread surfaces thereof on one side, and to a point just below the flanges of the traffic wheels on the other. The top section 3' of the mold is formed with a bottom surface to conform to the conjoint top surfaces of the two lower mold sections and, therefore, to form a substantially horizontal joint which will prevent leakage of the molten metal or slag. As in the first form described, the upper mold section 3' is provided with a basin-like cavity, the bottom of which is pierced by the usual pouring gate and vent opening.

Inasmuch as each of the refractory mold sections is enclosed in a suitable flask or box section provided with the usual means for clamping the several mold sections together and securing the same to the rail ends, it will be evident that the upper mold section may be disengaged from the two lower mold sections and removed promptly, when necessary to permit passage of traffic over the site of the joint.

What I claim is:

1. A mold for welding rails by superheated molten metal, comprising lower mold sections enclosing the rail ends to substantially the level of the tread surface of the rails, and an upper section fitted to and constituting a completing supplement to the lower sections, said upper section being separately removable to permit passage of traffic.

2. A mold for welding rails by superheated molten metal, comprising lower mold sections enclosing the rail ends to substantially the level of the tread surface of the rails, and a removable upper section fitted to and constituting a completing supplement to the lower sections, said upper section being provided with gate and vent openings in its bottom communicating with the mold space defined by the lower sections.

In testimony whereof I affix my signature.

JOHN H. DEPPELER.